US010034501B2

(12) United States Patent
Jensen (10) Patent No.: US 10,034,501 B2
(45) Date of Patent: Jul. 31, 2018

(54) WEARABLE METAL DETECTION SYSTEM (71) Applicant: Jesse Jensen, Metairie, LA (US)

(72) Inventor: Jesse Jensen, Metairie, LA (US)

( * ) Notice: Subject to any disclaimer, the term of this patent is extended or adjusted under 35 U.S.C. 154(b) by 0 days.

(21) Appl. No.: 15/888,759

(22) Filed: Feb. 5, 2018

(65) Prior Publication Data

US 2018/0153235 A1 Jun. 7, 2018

Related U.S. Application Data (60) Provisional application No. 62/508,776, filed on May 19, 2017.

(51) Int. Cl.
| G08B 1/08 | (2006.01) |
| A41D 19/00 | (2006.01) |
| A41D 1/00 | (2018.01) |
| A41D 19/015 | (2006.01) |
| G08B 3/10 | (2006.01) |
| G08B 15/00 | (2006.01) |
| G01V 3/00 | (2006.01) |

(52) U.S. Cl.
CPC ......... *A41D 19/0027* (2013.01); *A41D 1/002* (2013.01); *A41D 19/01505* (2013.01); *G08B 3/10* (2013.01); *A41D 2400/80* (2013.01); *A41D 2600/20* (2013.01); *G01V 3/00* (2013.01); *G08B 15/00* (2013.01)

(58) Field of Classification Search
CPC ................ A41D 19/0027; A41D 1/002; A41D 19/01505; G08B 3/10

USPC .................................................... 340/539.11
See application file for complete search history.

(56) References Cited

U.S. PATENT DOCUMENTS

| 4,423,377 A | * | 12/1983 | Podhrasky | ............. | G01V 3/107 |
| | | | | | 324/133 |
| 4,814,632 A | | 3/1989 | Glaeser et al. | | |
| 6,211,672 B1 | * | 4/2001 | Bauman | ................... | G01V 3/15 |
| | | | | | 324/226 |
| 7,221,552 B1 | | 5/2007 | Brown | | |
| 2007/0063848 A1 | | 3/2007 | Weisman | | |
| 2009/0231144 A1 | * | 9/2009 | Dahl | ........................ | G01V 3/15 |
| | | | | | 340/573.1 |

* cited by examiner

*Primary Examiner* — Kerri McNally
(74) *Attorney, Agent, or Firm* — Global Intellectual Property Agency, LLC; Jordan Sworen (57) ABSTRACT

A wearable metal detection system. The system includes a glove including a metal detection circuit disposed therein including a power supply, a first speaker, and a wireless transceiver each operably connected to a sensor configured to detect the presence of metal. The system further includes an earpiece including a power supply, a wireless transceiver, and a second speaker. A switch disposed on the glove allows a user to select between the first and second speakers. When the first speaker is selected, the first speaker emits an audible alert upon the sensor detecting metal. When the second speaker is selected, a detection signal is transmitted to the earpiece when the sensor detects a metallic object, and the second speaker then emits an audible alert. The glove may further include an inner lining, an outer layer, and a puncture-proof layer for protecting the wearer from puncture wounds while searching for metallic objects.

14 Claims, 6 Drawing Sheets

WEARABLE METAL DETECTION SYSTEM

CROSS REFERENCE TO RELATED APPLICATIONS

This application claims the benefit of U.S. Provisional Application No. 62/508,776 filed on May 19, 2017. The above identified patent application is herein incorporated by reference in its entirety to provide continuity of disclosure.

BACKGROUND OF THE INVENTION

The present invention relates to metal detection systems. More specifically, the present invention provides a wearable metal detection system including a glove configured to emit an audible alert via either one of a glove speaker or an earpiece speaker upon the detection of metal, wherein the glove optionally includes a puncture-proof layer.

Metal detectors are often utilized at security checkpoints to detect the presence of metallic objects in order to prevent weapons or other dangerous items from crossing the checkpoint. A typical metal detector includes a frame having an open center area. When an individual or object passes through the frame, the metal detector sounds an alert if metal is detected. One drawback of this system is that it alerts a potentially dangerous individual that a weapon they are carrying has been detected, possibly causing them to react violently. Further, if an individual or an item such as a bag needs to be searched for a metallic object, the individual conducting the search may be injured by the metallic object. For example, a needle in a pocket can puncture the hand of the individual searching for the object, which may lead to serious injury.

There exist portable metal detection systems that address some of the issues of a standing metal detection unit. For example, an individual may use a wireless metal detection wand to search another individual for metallic objects. However, the user's hands are occupied while holding and waving the wand, leaving them unable to defend themselves if the individual being searched becomes violent. Further, if the wand detects metal, the user must still search for the object and may potentially be injured while doing so. In view of the above concerns, it is desirable to provide a wearable metal detection system that allows users to manipulate objects while detecting for metal. It is also desirable to provide a wearable metal detection system that is puncture-proof to protect the wearer from injury while searching an item or individual for metallic objects.

In light of the devices disclosed in the known art, it is submitted that the present invention substantially diverges in design elements from the known art and consequently it is clear that there is a need in the art for an improvement to existing wearable metal detection systems. In this regard the present invention substantially fulfills these needs.

SUMMARY OF THE INVENTION

In view of the foregoing disadvantages inherent in the known types of wearable metal detection systems now present in the known art, the present invention provides a wearable metal detection system wherein the same can be utilized for providing safety and convenience for the user when scanning an individual, object, or other area for the presence of metal. The present wearable metal detection system includes a glove and an earpiece. The glove includes a hand portion including a rear side and a palm side, a wrist portion, and a plurality of finger portions, such that the glove is configured to receive a hand of a user therein. A metal detection circuit including a first speaker, a first power supply, and a first wireless transceiver each operably connected to a sensor configured to detect the presence of metal is disposed within the glove. The earpiece includes a second power supply, a second wireless transceiver, and a second speaker. The earpiece is configured to be removably securable to an ear of the user. The glove includes a selector switch moveable between a first position and a second position, the selector switch configured to select between the first speaker on the glove and the second speaker in the earpiece. The glove is configured to emit an audible alert via the first speaker when the sensor detects a threshold amount of metal and the selector switch is in the first position. The glove is further configured to transmit a detection signal to the earpiece via the first wireless transceiver when the sensor detects a threshold amount of metal and the selector switch is in the second position. The earpiece is configured to receive the detection signal via the second wireless transceiver and emit an audible alert via the speaker upon receiving the detection signal from the glove. In some embodiments of the present invention, the glove further includes an inner lining, an outer layer, and a puncture-proof layer disposed therebetween for preventing injury to the wearer while the wearer searches an item or an individual for metallic objects.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the wearable metal detection system. For the purposes of presenting a brief and clear description of the present invention, the preferred embodiment will be discussed as used for protecting a wearer's hands while providing a wearable device used for searching an individual for potentially dangerous metal objects. The figures are intended for representative purposes only and should not be considered to be limiting in any respect.

Figure 1:
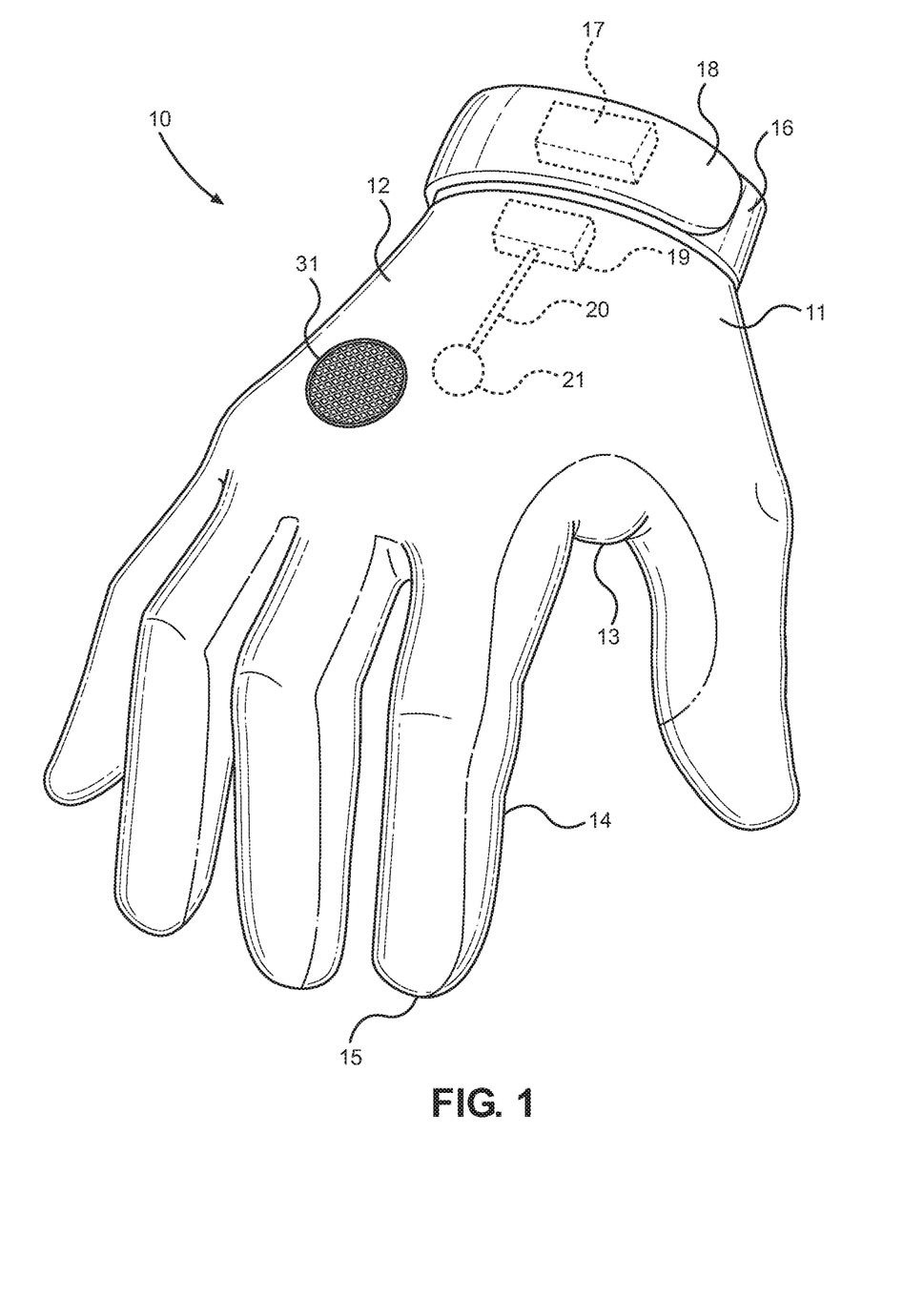
FIG. 1 shows a perspective view of the glove component of one embodiment of the wearable metal detection system.

Referring now to FIG. 1, there is shown a perspective view of the glove component of one embodiment of the wearable metal detection system. The wearable metal detection system includes a glove 10 including a hand portion 11 having a rear side 12 and a palm side 13, a plurality of finger portions 14, and a wrist portion 16 that includes an opening configured to receive the wearer's hand therethrough. In the shown embodiment, the finger portions 14 include a closed distal end 15 that encloses the fingertips of the wearer. Alternate embodiments may include an open end such that the fingertips of the wearer are exposed.

The shown embodiment further includes a wrist strap 18 including a fastener such as a hook and loop material, snaps, buttons, or the like. The wrist strap 18 is configured to adjust the diameter of the wrist portion, allowing the wearer to adjust the glove 10 to achieve a comfortable fit. Further, the shown embodiment depicts the glove 10 with a wrist portion 16 that only covers the wrist of the wearer. However, alternate embodiments of the present invention may include a glove 10 having a wrist portion 16 that includes a length equal to or greater than a length of the hand portion 11 of the glove 10, such that the wrist portion 16 extends upward along the forearm of the wearer. The longer wrist portion provides additional protection to the wrist and forearm of the wearer.

The glove 10 further includes a metal detection circuit disposed therein. The metal detection circuit includes a power supply 17 operably connected to a wireless transceiver 19 and a metal detection sensor 21 that is configured to detect the presence of a threshold amount of metal. The power supply 17 may be a rechargeable or replaceable battery. The wireless transceiver 19 may be a Bluetooth® transceiver or any other type of wireless transceiver capable of wirelessly transmitting a signal to another wireless transceiver of the same type. The metal detection sensor 21 is connected to the wireless transceiver 19 via at least one wire 20, enabling the wireless transceiver 19 to transmit a signal upon the metal detection sensor 21 detecting the presence of metal.

Figure 6:
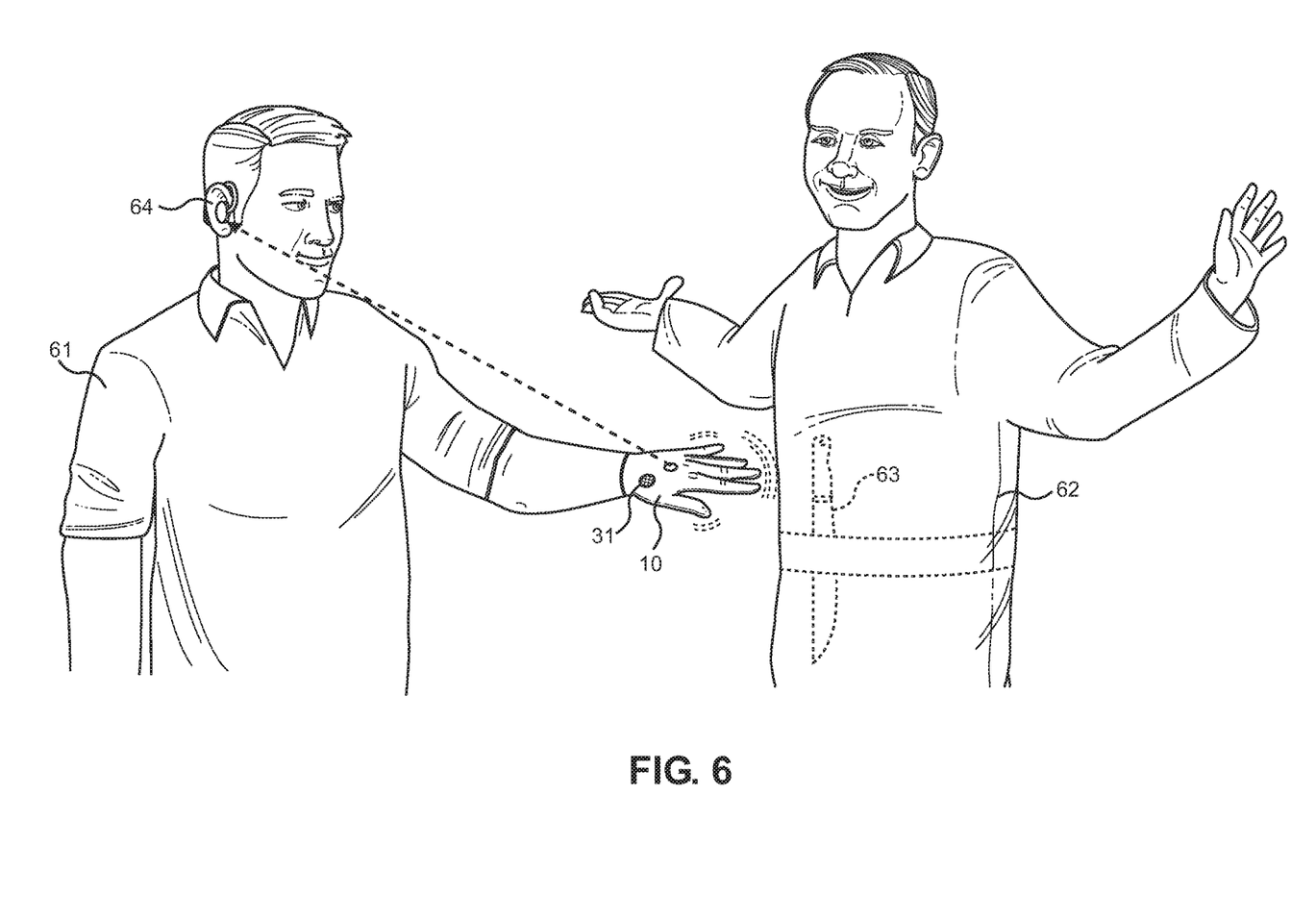
FIG. 6 shows a perspective view of one embodiment of the wearable metal detection system in use.

The glove 10 further includes a speaker 31 disposed thereon. In the illustrated embodiment, the speaker 31 is disposed on the rear side 12 of the hand portion 11. However, the speaker 31 may be disposed on other areas of the glove. A selector switch, shown in FIG. 3, allows users to select between the earpiece speaker and the glove speaker 31. When the selector switch is selecting the glove speaker 31, the glove speaker 31 is configured to emit an audible alert upon the sensor 21 detecting a threshold amount of metal. When the selector switch is selecting the earpiece speaker, the wireless transceiver 19 is configured to transmit a metal detection signal to the earpiece upon the sensor 21 detecting a threshold amount of metal, as shown in FIG. 6. The earpiece speaker is configured to emit an audible alert when the metal detection signal is received.

Figure 2:
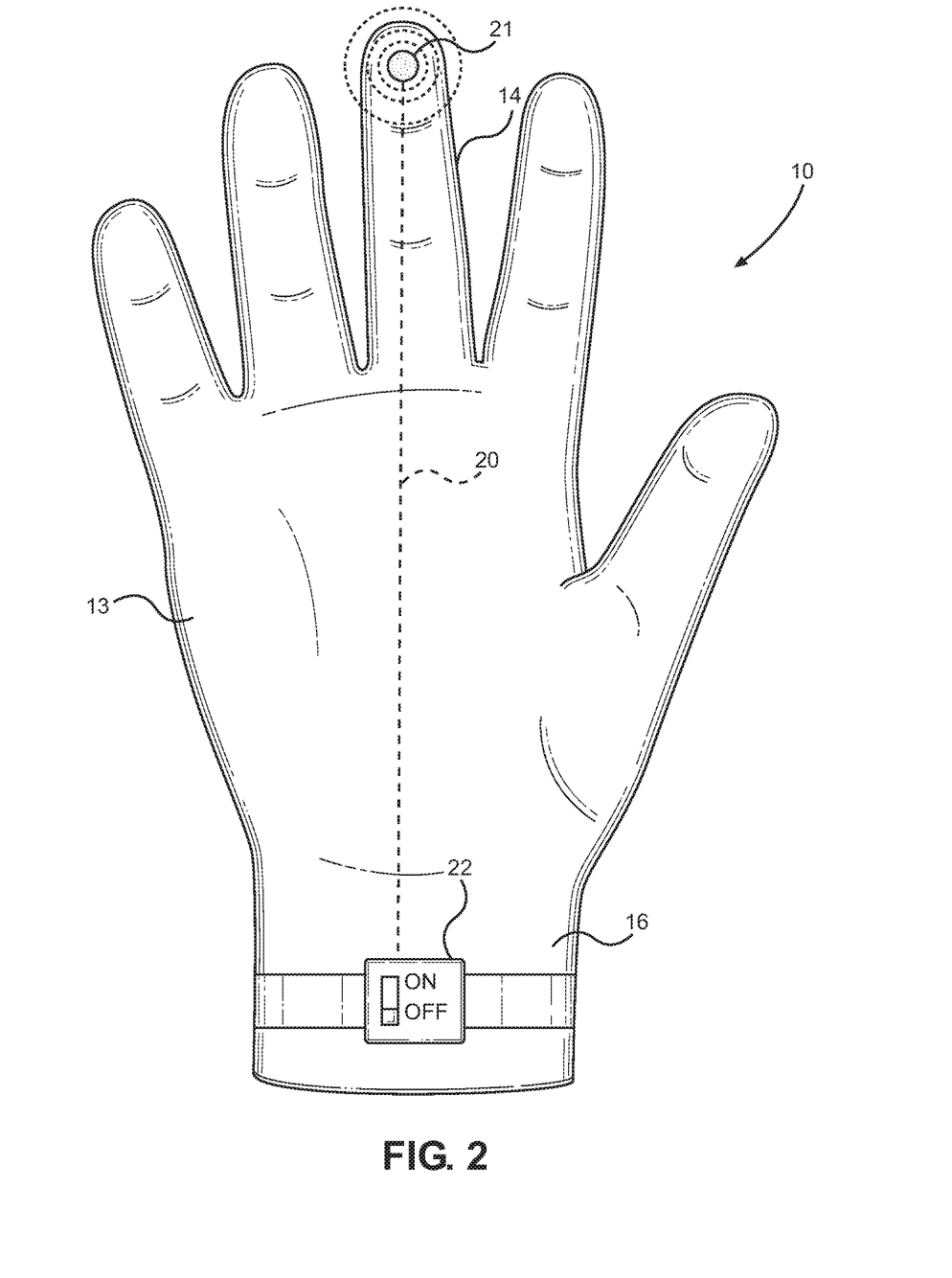
FIG. 2 shows a side elevation view of the palm side of the glove component of one embodiment of the wearable metal detection system.

Referring now to FIG. 2, there is shown a side elevation view of the palm side of the glove component of one embodiment of the wearable metal detection system. The glove 10 further includes a power switch 22 configured to selectively engage or disengage the metal detection sensor 21. The power switch 22 is preferably disposed on the wrist portion 16 of the glove 10 so that the power switch 22 is not toggled or actuated when the wearer inserts their hand into a suspect's pocket when searching for metallic objects. In the shown embodiment, the power switch 22 is disposed on the palm side 13 of the glove 10. Further, the metal detection sensor 21 is disposed within the finger portion 14 on the palm side 13 of the glove 10. This location allows the user to more easily manipulate the orientation or position of the sensor 21 when searching an individual for metallic objects. In the shown embodiment, the metal detection sensor 21 is disposed on the middle finger portion 14. However, the sensor 22 can be disposed on any of the finger portions.

Figure 3:
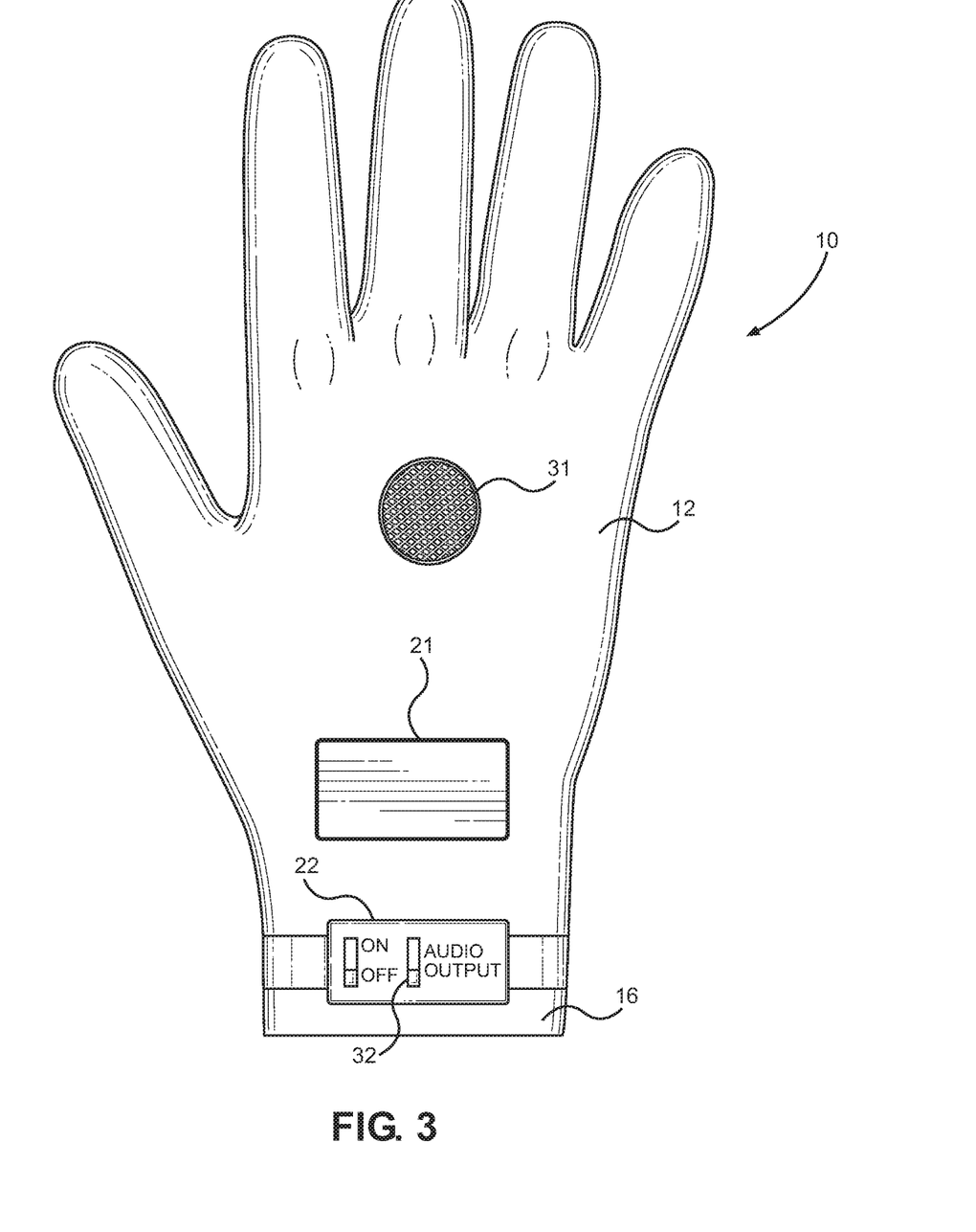
FIG. 3 shows a side elevation view of the rear side of the glove component of one embodiment of the wearable metal detection system.

Referring now to FIG. 3, there is shown a side elevation view of the rear side of the glove component of one embodiment of the wearable metal detection system. In this embodiment, the metal detection sensor 21 is disposed on the rear side 12 of the glove 10, allowing a user to search for metallic objects by waving the back of their hand over an area to be searched. Additionally, the shown embodiment includes the power switch 22 disposed on the wrist portion 16 on the rear side of the glove 10. The audio output switch 32 that allows users to switch between the glove speaker 31 and the earpiece speaker is shown disposed adjacent the power switch 22 for easy accessibility, however the switch can be located elsewhere on the glove 10.

Figure 4:
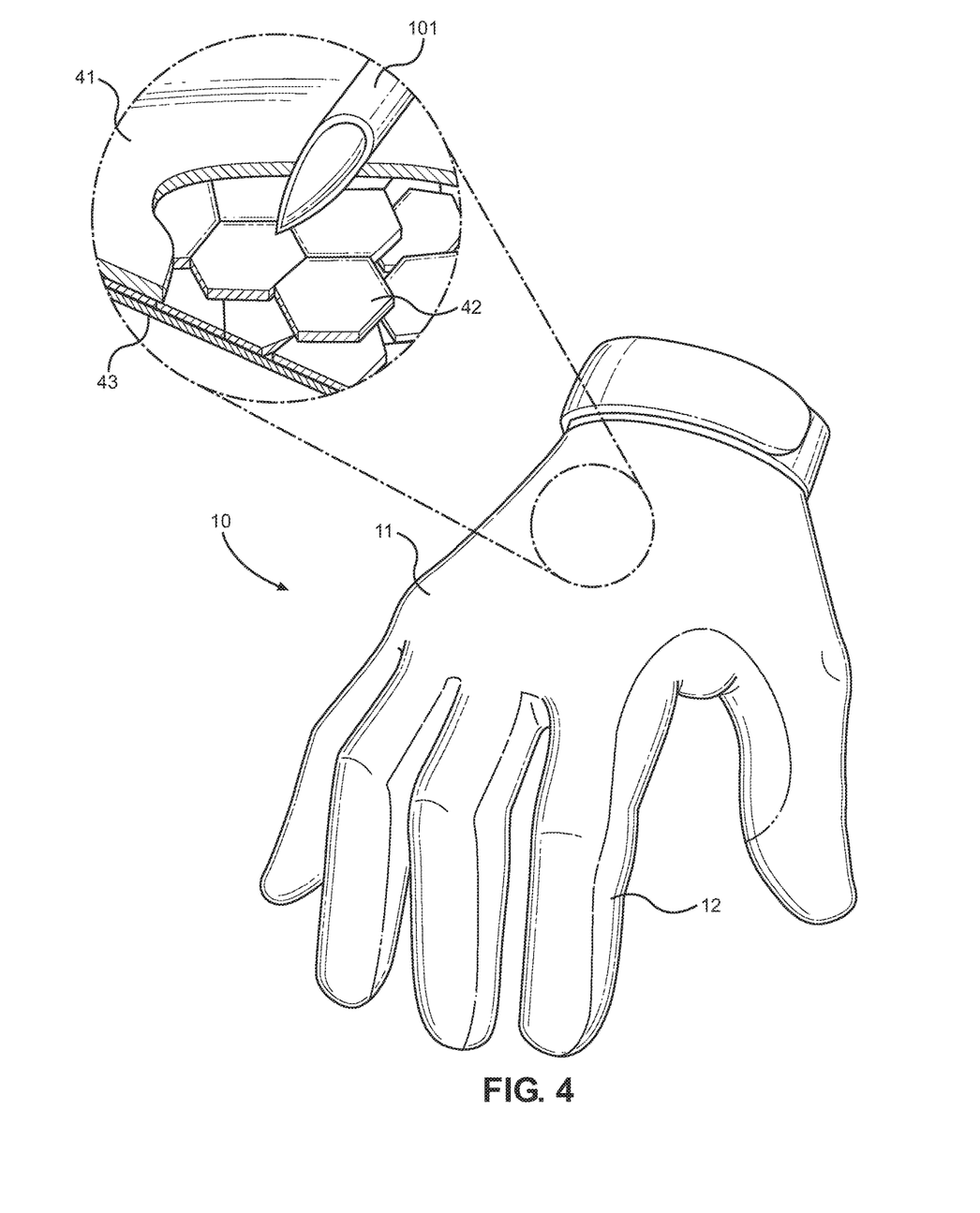
FIG. 4 shows a detail view of the different layers of the glove component of one embodiment of the wearable metal detection system.

Referring now to FIG. 4, there is shown a detail view of the different layers of the glove component of one embodiment of the wearable metal detection system. The glove 10 is constructed from a fabric that includes a plurality of layers. In the shown embodiment, the glove 10 includes an inner lining 43, an outer lining 41, and a puncture-proof layer 42 disposed therebetween. The inner lining 43 may include an insulated material and preferably is a soft material for increasing comfort for the wearer. The outer lining 41 may include a gripping, high-friction material, preferably with a coefficient of friction greater than one, so that the wearer can easily grasp a metallic object or other item without slippage.

The puncture-proof layer 42 is configured to prevent a needle 101 or other sharp object from piercing the glove 10 and potentially piercing the skin of the wearer. In the shown embodiment, the puncture-proof layer 42 includes a plurality of rigid plates disposed in an overlapping arrangement. The rigid plates may include a ceramic material or other type of material configured to prevent puncturing. The overlapping arrangement of the plates prevents gaps in the puncture-proof layer 42 from forming when the wearer bends or otherwise manipulates their hand and fingers, ensuring the wearer is protected from puncture wounds at all times while searching an individual.

Figure 5:
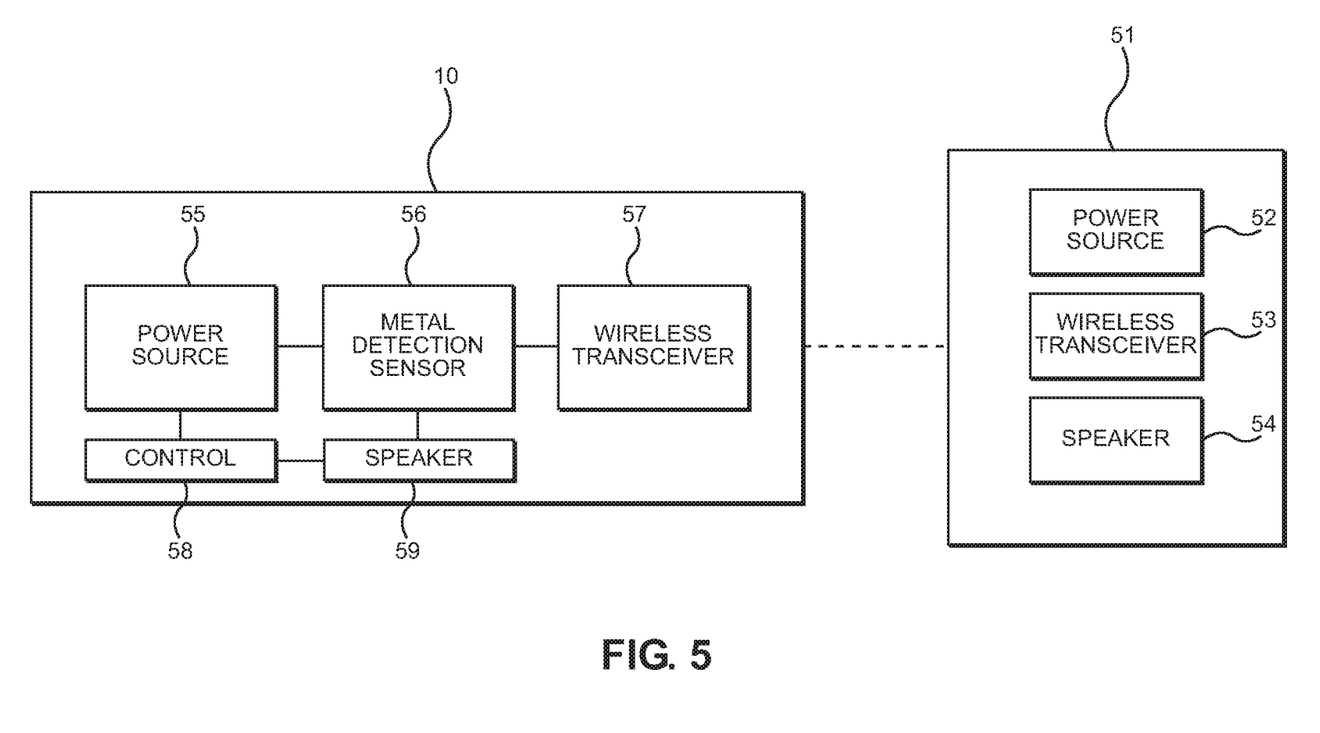
FIG. 5 shows a diagram of the electronic components of one embodiment of the wearable metal detection system.

Referring now to FIG. 5, there is shown a diagram of the electronic components of one embodiment of the wearable metal detection system. As discussed above, the glove 10 includes a first speaker 59, a speaker control 58, a power source 55, and a wireless transceiver 57 each operably connected to a metal detection sensor 56. The wearable metal detection system further includes an earpiece 51 configured to be removably secured to the ear of a wearer. The earpiece 51 includes a power source 52 operably connected to a wireless transceiver 53 and a second speaker 54. The speaker control 58 includes both the power switch and the speaker selector switch.

If the first speaker 59 is selected and the metal detection sensor 56 detects a threshold amount of metal, then an audible alert is emitted via the first speaker 59. If the second speaker 54 is selected and the metal detection sensor 56 detects a threshold amount of metal, the glove wireless transceiver 57 is configured to transmit a signal to the earpiece wireless transceiver 53. Upon receiving the signal from the glove 10, the earpiece 51 is configured to emit an audible alert via the second speaker 54. This configuration allows the wearer to choose between an audible alert that can be heard by any surrounding individuals, or a more discrete in-ear alert that notifies the wearer that metal has been detected without notifying the individual being searched that metal has been found their person.

Referring now to FIG. 6, there is shown a perspective view of one embodiment of the wearable metal detection system in use. In operation, a wearer 61 of the glove 10 can wave their hand in proximity of an individual 62 to be searched in order to detect the presence of metallic objects. Since the glove 10 allows the wearer to search for metallic objects while keeping their hand and fingers free, the wearer 61 may also insert their gloved hand into the individual's 62 pockets or under their clothing while searching. This allows the wearer to grasp, manipulate, remove, or otherwise interact with objects found on the searched individual 62 while simultaneously searching for metallic objects with the glove. The wearer can select between the glove speaker 31 and the earpiece 64, allowing the wearer to customize the type of audible alert that sounds when metal is detected. Further, the puncture proof layer of the glove prevents any sharp objects found from puncturing the wearer's skin, and additionally prevents puncture wounds if the individual 62 being searched becomes violent and attacks the wearer 61.

If a metallic object is detected, such as, for example, a knife 63, the glove 10 automatically either emits an audible alert via the glove speaker 31 or transmits a signal to the earpiece 64, depending upon the status of the speaker selector switch. The earpiece 64 and glove speaker 31 are each configured to emit an audible alert, notifying the wearer 61 that a metallic object has been detected by the glove 10. The wearer 61 can then take appropriate action in response to the metallic object being found, while the puncture-proof layer of the glove prevents injury during removal or manipulation of the metallic object.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wearable metal detection system, comprising:
a glove comprising a hand portion including a rear side and a palm side, a wrist portion, and a plurality of finger portions, the glove configured to receive a hand of a user therein;
a metal detection circuit disposed within the glove, the metal detection circuit comprising a first power supply and a first wireless transceiver each operably connected to a sensor configured to detect the presence of metal;
a first speaker disposed within the glove, the first speaker operably connected to the first power supply;
an earpiece comprising a second power supply, a second wireless transceiver, and a second speaker, the earpiece configured to be removably securable to an ear of the user;
a selector switch moveable between a first position and a second position, the selector switch configured to select between the first speaker and the second speaker;
wherein the first speaker is configured to emit an audible alert when the sensor detects a threshold amount of metal and the selector switch is in the first position;
wherein the glove is configured to transmit a detection signal to the earpiece via the first wireless transceiver when the sensor detects a threshold amount of metal and the selector switch is in the second position;
wherein the glove further includes an inner lining, an outer layer, and a puncture-proof layer disposed therebetween;
wherein the earpiece is configured to receive the detection signal via the second wireless transceiver and emit an audible alert via the second speaker upon receiving the detection signal from the glove.

2. The wearable metal detection system of claim 1, wherein the sensor is disposed within one of the plurality of finger portions of the glove.

3. The wearable metal detection system of claim 1, wherein the sensor is disposed on the rear side of the glove.

4. The wearable metal detection system of claim 1, wherein the wrist portion of the glove includes a strap having a fastener thereon, the strap configured to adjust a diameter of the wrist portion.

5. The wearable metal detection system of claim 1, further comprising a power switch operably connected to the metal detection circuit.

6. The wearable metal detection system of claim 5, wherein the power switch is disposed on the wrist portion on the rear side of the glove.

7. The wearable metal detection system of claim 5, wherein the power switch is disposed on the wrist portion on the palm side of the glove.

8. The wearable metal detection system of claim 1, wherein the puncture-proof layer comprises a plurality of rigid plates disposed in an overlapping arrangement.

9. The wearable metal detection system of claim 1, wherein the outer layer comprises a gripping material having a coefficient of friction greater than one.

10. The wearable metal detection system of claim 1, wherein the wrist portion includes a length equal to or greater than a length of the hand portion.

11. A wearable metal detection system, comprising:
a glove comprising a hand portion including a rear side and a palm side, a wrist portion, and a plurality of finger portions, the glove configured to receive a hand of a user therein;
a metal detection circuit disposed within the glove, the metal detection circuit comprising a first power supply and a first wireless transceiver each operably connected to a sensor configured to detect the presence of metal;
wherein the sensor is disposed within one of the plurality of finger portions of the glove;
a first speaker disposed within the glove, the first speaker operably connected to the first power supply;
an earpiece comprising a second power supply, a second wireless transceiver, and a second speaker, the earpiece configured to be removably securable to an ear of the user;

a selector switch moveable between a first position and a second position, the selector switch configured to select between the first speaker and the second speaker;
wherein the first speaker is configured to emit an audible alert when the sensor detects a threshold amount of metal and the selector switch is in the first position;
wherein the glove is configured to transmit a detection signal to the earpiece via the first wireless transceiver when the sensor detects a threshold amount of metal and the selector switch is in the second position;
wherein the earpiece is configured to receive the detection signal via the second wireless transceiver and emit an audible alert via the second speaker upon receiving the detection signal from the glove.

12. A wearable metal detection system, comprising:
a glove comprising a hand portion including a rear side and a palm side, a wrist portion, and a plurality of finger portions, the glove configured to receive a hand of a user therein;
a metal detection circuit disposed within the glove, the metal detection circuit comprising a first power supply and a first wireless transceiver each operably connected to a sensor configured to detect the presence of metal;
wherein the sensor is disposed on the rear side of the glove;
a first speaker disposed within the glove, the first speaker operably connected to the first power supply;
an earpiece comprising a second power supply, a second wireless transceiver, and a second speaker, the earpiece configured to be removably securable to an ear of the user;
a selector switch moveable between a first position and a second position, the selector switch configured to select between the first speaker and the second speaker;
wherein the first speaker is configured to emit an audible alert when the sensor detects a threshold amount of metal and the selector switch is in the first position;
wherein the glove is configured to transmit a detection signal to the earpiece via the first wireless transceiver when the sensor detects a threshold amount of metal and the selector switch is in the second position;
wherein the earpiece is configured to receive the detection signal via the second wireless transceiver and emit an audible alert via the second speaker upon receiving the detection signal from the glove.

13. A wearable metal detection system, comprising:
a glove comprising a hand portion including a rear side and a palm side, a wrist portion, and a plurality of finger portions, the glove configured to receive a hand of a user therein;
a metal detection circuit disposed within the glove, the metal detection circuit comprising a first power supply and a first wireless transceiver each operably connected to a sensor configured to detect the presence of metal;
a first speaker disposed within the glove, the first speaker operably connected to the first power supply;
an earpiece comprising a second power supply, a second wireless transceiver, and a second speaker, the earpiece configured to be removably securable to an ear of the user;
a selector switch moveable between a first position and a second position, the selector switch configured to select between the first speaker and the second speaker;
wherein the first speaker is configured to emit an audible alert when the sensor detects a threshold amount of metal and the selector switch is in the first position;
wherein the glove is configured to transmit a detection signal to the earpiece via the first wireless transceiver when the sensor detects a threshold amount of metal and the selector switch is in the second position;
wherein the wrist portion of the glove includes a strap having a fastener thereon, the strap configured to adjust a diameter of the wrist portion;
wherein the earpiece is configured to receive the detection signal via the second wireless transceiver and emit an audible alert via the second speaker upon receiving the detection signal from the glove.

14. A wearable metal detection system, comprising:
a glove comprising a hand portion including a rear side and a palm side, a wrist portion, and a plurality of finger portions, the glove configured to receive a hand of a user therein;
a metal detection circuit disposed within the glove, the metal detection circuit comprising a first power supply and a first wireless transceiver each operably connected to a sensor configured to detect the presence of metal;
a first speaker disposed within the glove, the first speaker operably connected to the first power supply;
an earpiece comprising a second power supply, a second wireless transceiver, and a second speaker, the earpiece configured to be removably securable to an ear of the user;
a selector switch moveable between a first position and a second position, the selector switch configured to select between the first speaker and the second speaker;
wherein the first speaker is configured to emit an audible alert when the sensor detects a threshold amount of metal and the selector switch is in the first position;
wherein the glove is configured to transmit a detection signal to the earpiece via the first wireless transceiver when the sensor detects a threshold amount of metal and the selector switch is in the second position;
wherein the wrist portion includes a length equal to or greater than a length of the hand portion;
wherein the earpiece is configured to receive the detection signal via the second wireless transceiver and emit an audible alert via the second speaker upon receiving the detection signal from the glove.

* * * * *